(12) United States Patent
Brogårdh

(10) Patent No.: US 6,540,471 B1
(45) Date of Patent: Apr. 1, 2003

(54) DEVICE FOR RELATIVE DISPLACEMENT OF TWO ELEMENTS

(75) Inventor: Torgny Brogårdh, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/341,334

(22) PCT Filed: Jan. 14, 1998

(86) PCT No.: PCT/SE98/00046

§ 371 (c)(1),
(2), (4) Date: Sep. 2, 1999

(87) PCT Pub. No.: WO98/30366

PCT Pub. Date: Jul. 16, 1998

(30) Foreign Application Priority Data

Jan. 14, 1997 (SE) ................................................ 9700090

(51) Int. Cl.[7] .............................................. B25J 18/00
(52) U.S. Cl. .................... 414/729; 74/490.05; 414/917; 901/15
(58) Field of Search ................. 414/729, 735, 414/917; 74/490.06, 490.01, 490.05, 490.07; 901/15, 28

(56) References Cited

U.S. PATENT DOCUMENTS

| 4,483,074 A | 11/1984 | Rudzyanskas et al. |
| 4,522,555 A | 6/1985 | Inoue et al. |
| 4,976,582 A | 12/1990 | Clavel |
| 5,222,409 A | 6/1993 | Dalakian |
| 5,263,382 A | 11/1993 | Brooks et al. |
| 5,577,414 A | 11/1996 | Ogawa et al. |
| 5,622,084 A | 4/1997 | Telldén |
| 5,656,905 A * | 8/1997 | Tsai .......................... 901/15 X |

FOREIGN PATENT DOCUMENTS

| DE | 3445055 | 12/1986 |
| FR | 2572981 | 11/1984 |
| SE | 502256 | 9/1995 |
| WO | WO 97/33726 | 9/1997 |

* cited by examiner

*Primary Examiner*—Donald W. Underwood

(57) ABSTRACT

A device for relative movement of two elements (1, 2) comprises two link arrangement (5, 6) coupled in series by means of a connection arrangement (4). A first link arrangement (5) comprises at least three links (9, 14), which have substantially equal length and which are substantially parallel, said links (9, 14) being oriented in a substantially triangular relation, viewed along the longitudinal direction of the links, between the connection arrangement (4) and the element (2). The second link arrangement (6) comprises at least one parallelogram acting between the connection arrangement (4) and the element (1). First the second force-applying arrangements (17, 18) are adapted to cause the first link arrangement (5) to pivot. A third force-applying arrangement (33) is adapted to cause the second link arrangement (6) to pivot.

13 Claims, 8 Drawing Sheets

DEVICE FOR RELATIVE DISPLACEMENT OF TWO ELEMENTS

FIELD OF THE INVENTION

This invention is related to a device for relative movement of two elements comprising an arrangement for forming a connection between a first link arrangement and a movement arrangement, the movement arrangement being provided between the connection arrangement and one of the elements whereas the first link arrangement is provided between the connection arrangement and a second of the elements.

The relative movement of the two elements has the purpose to position them mutually in a manner aimed at by means of the force-applying arrangements. More specifically, the device according to the invention is intended to form a manipulator or robot. The second of the elements is intended to carry, directly or indirectly via a carrying arrangement, or constitute a working member to execute the function aimed at, for instance picking, placing, packing and palletising. However, it is remarked that the working member may be adapted to carry out also other work operations than those just mentioned. The first element may according to a first embodiment form a base member secured in space but could according to a second embodiment form at least a part of a carrier movable relative to a base member. A force-applying arrangement then serves for adjusting the position of the carrier relative to the base member.

PRIOR ART

A robot of the kind defined by way of introduction is described in U.S. Pat. No. 4,976,582. For the positioning of the second element, the robot comprises three force-applying arrangements, which in unison comprise three force-exerting members arranged in a triangular distribution on the first element. Each of the force members is connected to the movable second element via its own connection comprising two link arrangements and an intermediate connection arrangement. These three connections coupled in parallel are like-wise arranged in a triangular distribution. Each of these connections comprises a first link arrangement including two first links pivotably connected to the second element and a second link, which is rigidly connected to a movable portion of the force-exerting member and which by means of a connection arrangement is connected to the two first links. The second link is movable with regard to one single degree of freedom relative to the stationary portion of the power-exerting member. The connection arrangement connects the first and second links in a hinged manner with two but not more than two degrees of freedom. The link arrangement formed by the first links is connected to the second element so that two but not more than two degrees of freedom occur. In reality, the first link arrangements form parallelogram-shaped four-links systems. A disadvantage with this known type of robot is that it becomes comparatively bulky as a consequence of the triangular distribution discussed herein above. The angle between planes of pivoting of two adjacent second links must, namely, always be less than 180°. Thus, it is very difficult to arrange two or more of those robots closely to each other without collision. A further disadvantage is that it is structurally difficult to design the known robot with the required stiffness and strength since the movable portions of the three power-exerting members project in a star-like fashion from the first element, which with regard to the space requirement should be formed as small as possible but which on the other hand must be able to receive the power-exerting members. Thus, this means that it becomes difficult to design arms rigidly connected to the movable portions of the power-exerting members with a sufficient width as far as the arms themselves are concerned as well as their bearings at the first element.

A further disadvantage is that all arm lengths must be equal. This means that it is not possible to optimize the robot to the pattern of movement in question. Performance will always be symmetrically distributed in a symmetrical working area, which is not cost efficient.

Furthermore, the known robot cannot execute a tilt movement of the second element to fetch objects located sidewardly of or above the robot.

In addition, 3 further motors are required in order to change the inclination of the second element. It would be desirable to manage this will only 1 extra motor in order to achieve a cost-efficient concept.

As a consequence of the equilateral triangular construction of the known robot it is also difficult to arrange to work horizontally above conveyors, loading pallets etc. Furthermore, it should be mentioned that if a working member on the second element is to be driven by means of a motor on the first element, an axle extending between the first and second elements must comprises a torque-transmitting coupling allowing variation of the length of the axle. In practice, the axle is suitably designed as consisting of two axle parts, which are displacable telescopically relative to each other and the torque transmission of which is ensured by splines, wedge grooves or similar. This complicates the embodiment and makes the same more costly.

OBJECT OF THE INVENTION

This invention aims at devising routes to develop the device of the kind defined by way of introduction so as to eliminate or at least reduce one or more of the disadvantages mentioned herein above. According to a sub aspect, the aim is to provide a greater flexibility as to the design of the device so that two or more devices may be placed to work comparatively close to each other. According to another sub aspect, an improved mobility of the robot is aimed at.

SUMMARY OF THE INVENTION

The object of the invention is achieved in that the first link arrangement comprises links pivotably connected relative to the connection arrangement and the associated of the elements via joints, that the movement arrangement is adapted to allow a relative movement between the connection arrangement and the associated of the elements, and that the device comprises force-applying arrangements to actuate the link arrangement and the movement arrangement so as to change the relative position between the elements.

Thus, the link arrangement forms an interconnection between the connection arrangement and the associated of the elements by means of at least two and preferably three links. This creates possibilities for an asymmetrical design of the device according to the invention and, accordingly, an adjustment of the working area thereof to its purpose. For instance, this asymmetrical character of the device according to the invention provides possibilities for a very dense packing of a plurality of robots. This differentiates the device according to the invention from the device according to U.S. Pat. No. 4,976,582, where a triangular structure with equal sides is aimed at and where in any case the angle between the planes of pivoting of two adjacent second links always must be less than 180°.

It is according to an embodiment possible to design the displacement arrangement as a second four-links system. In such cases the first and second four-links systems will, accordingly, be coupled in series to each other via the connection arrangement. This provides the device with very favourable operational qualities. A particularly advantageous option resides in the second four-links system being possible to use for achieving tilting of the working member by means of a force-applying arrangement comprising one single force-exerting member.

The use of two four-links systems coupled in series via the connection arrangement involves, in addition, in case the four-links systems are designed as parallelograms, that it is made possible to achieve force transmission via axles provided in the four-links systems and with assistance of cardan joints, angular gears and the like without having to introduce, in the axle sequence, any sliding couplings or similar intended to operate axle length compensating.

According to a preferable embodiment of the invention, the movement arrangement is designed as a pivot arm.

Several preferable developments of the invention are defined in the dependent claims. These developments and advantages in connection with the invention are dealt with more specifically in the following description.

SHORT DESCRIPTION OF THE DRAWINGS

With reference to the enclosed drawings, a more close description of embodiment examples of the invention follows hereunder:

In the drawings;

FIGS. 12–13;

DETAILED DESCRIPTION OF PREFERRED EMBODIMENTS

In order to simplify the understanding, like reference characters have been used in the following in different embodiments for similar or corresponding components but with addition of letters specific to embodiments.

Figures 1, 2, 3, 4:
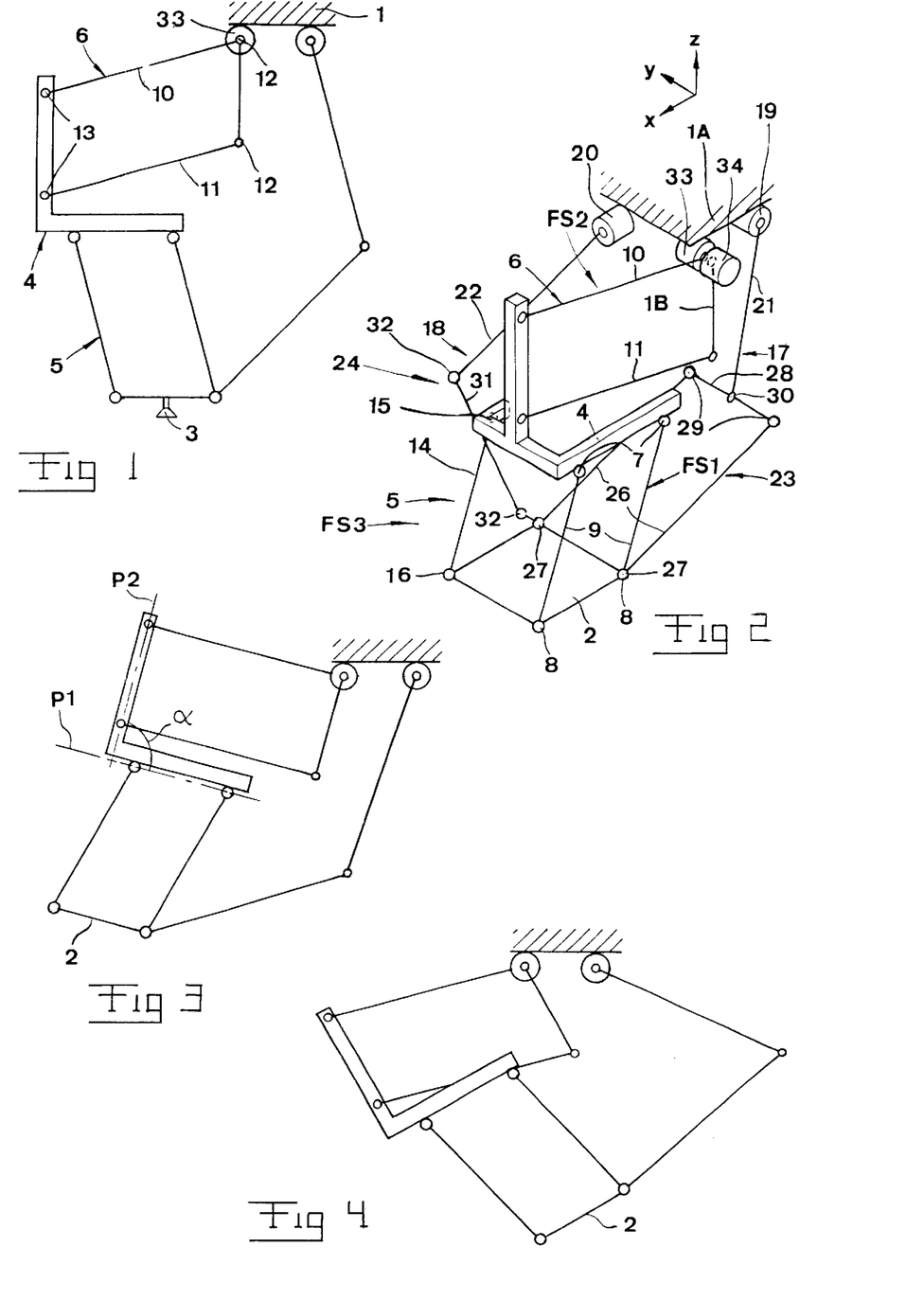
FIG. 1 is a side view of the robot according to the invention in a diagrammatical form.
FIG. 2 is a, still, diagrammatical view of the robot in perspective.
FIGS. 3 and 4 are views similar to FIG. 1 of the robot in different positions.

The robot illustrated in FIGS. 1–4 is intended for relative displacement of two elements 1, 2. The element 1 is in this example intended to form a base member, relative to which the element 2 is intended to be positioned in space. The element 2 is intended to carry, either directly as indicated in FIG. 1, or, as will be dealt with later, indirectly via a carrying arrangement, a working member 3.

The robot comprises an arrangement 4 for forming a connection between a link arrangement 5 and a movement arrangement 6. The link arrangement 5 is provided between the connection arrangement 4 and the second element 2 whereas the movement arrangement 6 is provided between the connection arrangement 4 and first element 1. The link arrangement 5 comprises at least two first links 9 pivotably connected relative to the connection arrangement 4 and the element 2 via joints 7 and 8 respectively, said first links forming, together with the connection arrangement 4 and the element 2, a first four-links system FS1. The joints 7, 8 of each of those links 9 are designed such that the link in question becomes pivotable in all directions relative to both the connection arrangement 4 and the element 2.

The movement arrangement 6 is adapted to allow relative movement between the connection arrangement 4 and the first element 1. More specifically, the movement arrangement 6 is intended to be used for movement of the connection arrangement 4 relative to element 1. It is then preferred that the movement arrangement 6 is adapted to maintain, on such relative displacement between the element 1 and connection arrangement 4, a substantially constant relation between themselves as far as inclination is concerned. Expressed in other words, the connection arrangement 4 is intended to be moved, on operation of the movement arrangement 6, relative to the element 1 without changing the orientation of the connection arrangement 4 in space. As an example of movement arrangements 6, those capable of achieving linear movements, for instance piston cylinder mechanisms, ball screw arrangements and rack driving devices may be mentioned. By such linear displacement the constant orientation of the connection arrangement 4 is ensured. However, it is pointed out that also types of movement arrangements may be in question.

According to a particularly preferred embodiment of the invention, the movement arrangement 6 is designed as a second link arrangement comprising at least one second link 10 pivotable relative to the connection arrangement 4 and the first element 1. It is then particularly preferred that the link arrangement 6 comprises at least two second links 10, 11 pivotable relative to the connection arrangement 4 and the first element 1. The link arrangement 6 forms with its link 10, 11 and together with the connection arrangement 4 and the element 1 a second four-links system FS2. The joints of the links 10, 11 relative to element 1 are denoted 12 whereas the joints relative to the connection arrangement 4 are denoted 13 (see FIG. 1).

It is preferred that the joints 12, 13 in the four-links system FS2 allow one single degree of freedom, i.e. a pure pivoting movement about pivoting axes parallel to each other. Thus, the four-links system FS2 will pivot in parallel planes.

The link arrangement 5 comprises at least one third link 14 pivotably connected relative to the connection arrangement 4 and the element 2 via joints 15 and 16 respectively. The joints 7, 15; 8, 16 of the first and third links 9, 14 are disposed in a triangular configuration. A right-angled triangular configuration is illustrated in FIGS. 1–4 but the angles thereof could also be smaller or larger than a right angle. The minimum criterium in this respect is that the joints form said triangular configuration, i.e. that the joints are not located in one and the same plane. The triangular configuration means that the links 9, 14 will carry the element 2 in at least three points.

The link 14 forms with each of the links 9, the connection arrangement 4 and the element 2 a third four-links system FS3. Accordingly, two four-links systems FS3 are involved in the example. It is pointed out that of course more than one link 14 may occur. More four-links systems FS3 are then of course formed. Besides, more than two links 9 may occur so that, accordingly, more four-links systems FS1 are formed. The links 9 are substantially equal in length. In addition, they are substantially parallel. Thus, the four-links system FS1 forms a parallelogram.

The links 10, 11 are substantially equal in length. They are also preferably substantially parallel. Thus, also the four-links system FS2 forms a parallelogram.

The link 14 is substantially equal in length to the links 9. Besides, the link 14 is preferably substantially parallel to the links 9. Each of the two four-links systems FS3 occurring in the example forms, accordingly, parallelograms. It is pointed out that in case several links 14 occur, they should be substantially equal in length to the links 9 and substantially parallel thereto. It is pointed out that the link arrangements 5 and 6 in the example are connected by means of the connection arrangement 4 such that an angle α, more specifically, a substantially right angle, is present between a plane P1 through the joints 7 and 15 and a plane P2 (see FIG. 3) intersecting the joints 13 and extending perpendicularly to the plane of pivoting of the links 10, 11. As will appear in the following, said angle may, however, be arbitrary within the internal 0–360°. In the embodiment illustrated and having an angle of about 90°, the connection arrangement 4 will, viewed from the side according to FIGS. 1 and 3–4, comprise a substantially L-like shape. In the orientation according to the figures the connection arrangement 4 comprises, viewed from the side, a substantially vertical shank and a substantially horizontal shank. The vertical shank is coupled to the links 10, 11 whereas the horizontal is coupled to the links 9 and 14. The horizontal shank may have, as viewed from above, an angle shape with two legs, one of which extends along FS1 whereas the other extends along one of FS3.

The links 9, 14 of the first link arrangement 5 and the joints 7, 8 and 15, 16 respectively belonging thereto form in this case between the connection arrangement 4 and the second element 2 connections, which all allow relative rotation about axes substantially parallel to the links. Such an embodiment presupposes that the links 7, 8, 15, 16 give three degrees of freedom, namely the previously discussed pivoting about two real or virtual axes at an angle to each other plus said rotation about axes parallel to the links 9, 14. Such a design has the advantage that the links 9, 14 and their joints do not have to be dimensioned in order to adopt rotational strains. An example of design of the joints for this purpose is as ball joints. However, it is pointed out that the minimum criterion for functionality according to the invention as far as the joints 7, 8 and 15, 16 are concerned is that they should provide freedom for the links 9, 14 to pivot in all directions in relation to the connection arrangement 4 and the second element 2, i.e. that two degrees of freedom in the form of pivoting about two axes forming an angle between themselves must occur. When not more than two degrees of freedom in this way are present, the links and their joints are capable of transferring rotational strains about axes parallel to the links. In such a case the joints could consist of cardan joints or other joints having double, non-parallel pivot axes.

First 17 and second 18 force-applying arrangement are adapted to cause the links 9, 14 in the link arrangement 5 to pivot relative to the connection arrangement 4. The arrangements 17, 18 comprise each a power-exerting member 19 and 20 respectively having a stationary portion rigidly connected relative to the element 1 and a movable portion 21 and 22 respectively having one single degree of freedom relative to the stationary portion and being connection to the element 2 via a respective link arm arrangement 23, 24. The force-applying arrangements 17, 18 are adapted to actuate the element 2 in mutually different directions to adjust the same in space.

The link arm arrangement 23 in one of the force-applying arrangements, namely the one denoted 17, comprises at least two link arms 26, which are hingedly connected to the element 2 via joints 27 and to the movable portion 21 via joints 29. Each of these joints 27, 29 should be designed so as to allow pivoting of the individual link arm 26 in all directions relative to the second element 2 and movable portion 21, i.e. that at least two degrees of freedom should be present, namely possibility for pivoting about double, non-parallel pivoting axes. The joints may, thus, in this case consist of cardan joints or other two axes joints. In addition, it is included within the scope of the invention that each of the joints 27, 29 may comprise a further degree of freedom relative to the element 2 or the movable portion 21, namely rotation about an axis substantially parallel to the link arm 26 in question. In such a case the joints may for instance be formed by ball joints.

The link arm arrangement 23 comprises in the example a third link arm 28, which is connected to the link arms 26 via the joints 29. On the other hand, the link arm 28 is rigidly connected to the movable portion 21 or alternatively connected to the portion 21 via a joint 30 comprising one single degree of freedom, i.e. in practice pure rotation.

The link arms 26 form, together with the associated joints 27, 29, a four-links system. It is preferred that this system is designed as a parallelogram.

Since the movable portion 21 presents only one degree of freedom relative to element 1, the link arm 28 will maintain its orientation in space. The parallelogram structure formed by said link arm and the link arms 26 in combination with the element 2 involves, accordingly, that the force-applying arrangement 23 in its entirety will lock the second element 2 against pivoting relative to the connection arrangement 4 about axes substantially perpendicular to planes, in which joints 7, 15; 8, 16 present at the ends of the links 9, 14 reside. This characteristic of the link arm arrangement 23 involves, accordingly, that the element 2 will be locked in space, provided that FS2 is lockable, as far all degrees of freedom are concerned, except for one further, which accordingly must be provided by the second force-applying arrangement 18.

The only remaining degree of freedom may be locked in case the link arm arrangement 24 comprises one single link arm 31, which is connected to the movable portion 22 and the second element 2 via joints 32. These joints should be designed so that the link arm 31 is pivotable in all directions relative to the movable portion 22 as well as to element 2. In addition, the joint 32 could allow one further degree of freedom in the form of rotation about an axis parallel to the link arm 31 relative to the movable portion 22 and the element 2. In the latter case, three degrees of freedom would be at hand. Thus, the joints 32 could consist of cardan joints, other joints allowing pivoting about double, non-parallel axes, universal joints, ball joints etc. An alternative to design of the link arm arrangement 24 as consisting of one single link arm 31 is to design the same analogous to the link arm arrangement 23. This is not necessary in order to achieve locking of all degrees of freedom but may be desirable in certain cases due to the extra stability achieved with double link arms.

It is pointed out that hereinafter joints allowing one single degree of freedom at times will be indicated by means of an oval (see the joint 30) in perspective views whereas joints with two more degrees of freedom are indicated with a circle.

The power-exerting member 19 and/or 20 is, in the example, formed by a rotary means, the stator of which forms the stationary portion and the rotor of which forms or is included in the movable portion 21 and 22 respectively. In the example the movable portion 21, 22 has the character of an arm pivotable with one degree of freedom. However, it is pointed out that the movable portion 21 and 22 respectively also could be movable as far as one single other degree of freedom is concerned, for instance translation. Such portion 21, 22 movable in translation would then in an analogous manner be connected, by means of its extreme end, to the link arm arrangement 23 and 24 respectively.

A third force-applying arrangement 33 is adapted to cause the second links 10, 11 to pivot relative to the element 1. The arrangement 33 comprises a power-exerting member having a stationary portion rigidly connected relative to the first element 1 and a movable portion which is connected to one of the links, namely the one denoted 10. The power-exerting member 33 is suitably formed by a rotary means, the stator of which forms the stationary portion and the rotor of which is rigidly connected to the link 10.

As far as the robot has been described until now and based on FIG. 1, pivoting of the links 10, 11 by means of the force member 33 causes the connection arrangement 4 to be moved in space in a parallel manner while maintaining its orientation and the corresponding is relevant as to the element 2 by intermediary of the link arrangement 5.

However, the robot comprises a design, by means of which the element 2 may be changed as far as its orientation is concerned, i.e. titled, and this more specifically as a consequence of a change of form of the link arrangement 6. For this purpose the first element 1 is formed by two parts 1A and 1B, which are hingedly connected to each other about an axis coinciding with the hinge axis 12 of the link 10. A fourth force-applying arrangement 34 is adapted to pivot the second part 1B relative to a first 1A of the parts. This second part 1B forms a link in the four-links system FS2 in that it is hingedly connected to the two link 11. The arrangement 34 comprises a power-exerting member having a stationary portion rigidly connected to the element part 1A and a movable portion rigidly connected to the part 1B. More specifically, the power member 34 is formed by a rotary means, the stator being connected to the part 1A and the rotor of which is connected to the part 1B.

When the force member 33 is immobilized, the link 10 assumes one and the same position in space. When the force member 34 is driven, the part/link 1B will be pivoted in space and then also relative to the link 10. This gives rise to a deformation of the parallelogram FS2 such that the connection arrangement 4 and, accordingly, also the element 2 will be inclined as appears from FIGS. 3 and 4. Such inclination involves a further degree of freedom for a working member provided on the element 2. When the force member 34 is immobilised, the link/part 1B assumes, always, one and the same position relative to the part 1A, which means that then no tilting of the element 2 may occur but instead pivoting of the link 10 involves movement in the space of element 2 while maintaining a constant orientation.

It appears from FIG. 2 that the element 2 may be moved in the plane XY by pivoting of the links 9, 14 may means of the force-applying arrangements 17, 18. By pivoting the links 10, 11 the element 2 may be displaced in the XZ-plane.

However, it is pointed out that it is well within the scope of the invention that the parallelogram FS2 works more or less obliquely relative to the XZ-plane.

Figure 5:
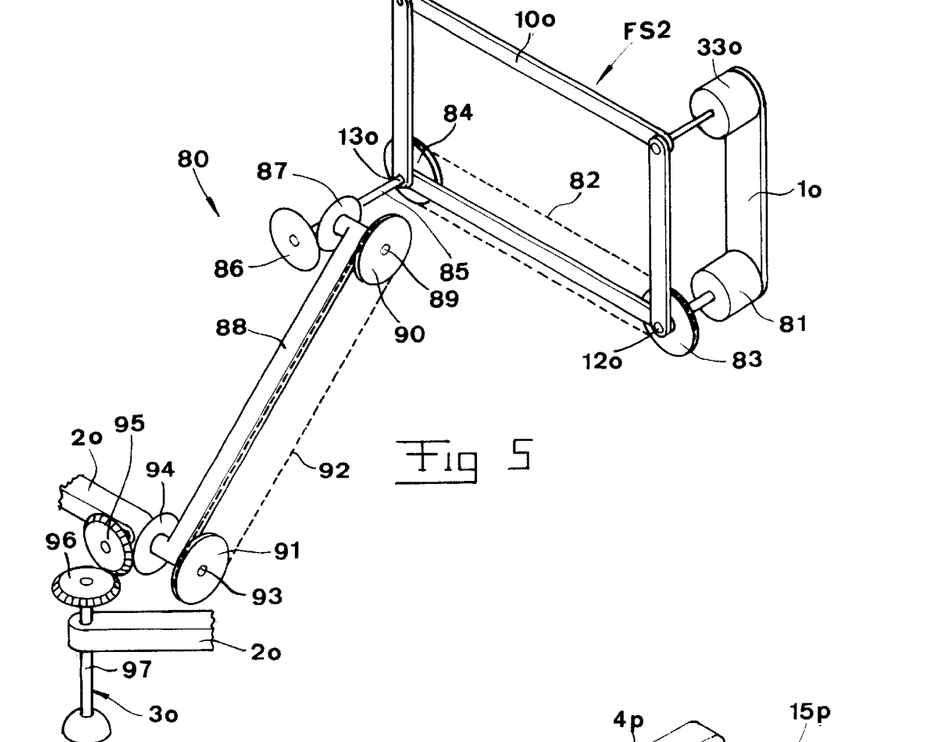
FIG. 5 is a diagrammatical and perspective view illustrating a transmission for incorporation into a robot of the basic structure appearing from FIGS. 1–4.

The transmission 80 illustrated in FIG. 5 is adapted to transmit driving force, in a robot of the basic type illustrated in FIGS. 1–4, from a force-exerting arrangement 81 provided on the first element 1o to the working member 3o in order to turn the same relative to the second element 2o. The four-links system FS2 is illustrated in FIG. 5 but not the link arrangement 5 and neither any connection arrangement 4 for mutually connecting the four-links system FS2 and the link arrangement. The force member 33o intended for pivoting the link 10o is, however, illustrated in FIG. 5.

The transmission 80 comprises first force transmitting members extending along the four-links system FS2. More specifically, these force transmitting members comprise a traction force transmitting element 82 laid around diverting wheels 83, 84. These diverting wheels 83, 84 have their axes of rotation coinciding with joints 12o and 13o in the four-links system FS2. The force member 81 in the form of a rotary motor has its stator fixed to the first element 1o and its rotor drivingly connected to the diverting wheel 83. The second diverting wheel 84 is drivingly connected to an axle 85, which carries a gear wheel 86, which in connection with a further gear wheel 87, forms an angular gear.

A link 88 is diagrammatically illustrated in FIG. 5. This link may be formed by some of the links comprised in the first link arrangement 5 (compare with FIGS. 1–4) but could also consist of a further link arranged in a parallel relation to the links in the link arrangement 5. Independently of the individual case, the gear wheel 87 is connected to an axle 89, on which a further diverting wheel 90 is placed. Around this diverting wheel 90 and a diverting wheel 91 arranged at the opposite end of the link 88, a second traction force transmitting element 92 is laid. The diverting wheel 91 is arranged on an axle 93, on which also a bevel gear wheel 94 is arranged. This gear wheel 94 is in engagement with a further bevel gear wheel 95, the axis of rotation of which is perpendicular to the axle 93. This gear wheel 95 is in its turn in angular engagement with a further gear wheel 96, the axis of rotation of which is perpendicular to the axis of rotation of the gear wheel 95. Thus, the gear wheel 95 has teeth shaped such, suitably on both sides, that it may be in engagement with both gear wheels 94 and 96. The working member 3o is in the example connected to the gear wheel 96 via the common axle 97 so as to be secured against rotation relative to the gear wheel 96. The gear wheel 95 and its axle is rotatably journalled on a part comprised in the second element 2o as indicated in FIG. 5.

The angular gears described and formed by means of the gear wheels 86, 87 and 94 and 95 respectively form joints allowing the desired adjustment of the four-links system FS2 and also the four-links systems FS1 and FS3 contained in the link arrangement 5 without the force transmission illustrated in FIG. 5 involving any limitation on the full mobility of the four-links systems.

Figure 6:
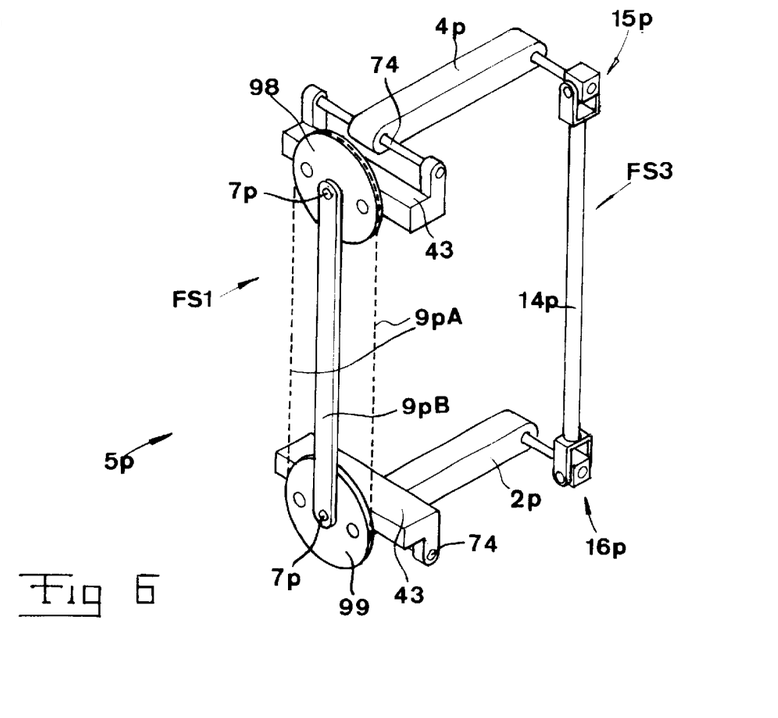
FIG. 6 is a detailed view illustrating an alternative embodiment of the first link arrangement.

A somewhat modified design of the link arrangement 5p is illustrated in FIG. 6. The link arrangement 5p forms, still, the four-links systems FS1 and FS3 in a manner previously described with assistance of FIGS. 1–4. However, the difference is that the four-links system FS1 is formed by two traction force transmitting, but not compression-force transmitting, first links 9pA and, besides, a further first link 9pE, which, however, is compression-force transmitting, i.e. defines the distance. It should be pointed out already now that the links 9p, 14p of the first link arrangement 5p and the joints associated thereto form connections between the connection arrangement 4p and the second element 2p, at least one of these connections being rigid against rotation, i.e. capable of transferring torque about an axis parallel to the connection. In the example, both links 9p and 14p form such connections rigid to rotation.

The first links 9pA and 9pB are formed by traction force transmitting elements arranged to maintain the orientation in space of the associated second element 9p on movement of the link arrangement 5p. The two traction force transmitting elements form parts of a loop laid around diverting members 98, 99 connected to the connection arrangement 4p and the second element 2p respectively. The loop is secured against displacement relative to the diverting members 98, 99. The latter ones form substantially arc-shaped diverting paths for the parts of the loop. At a suitable place along these diverting paths, the loop is secured relative to the diverting members 98, 99 by means of suitable securing elements. In the example it appears that the diverting members 98, 99 are formed by wheels having a peripherical groove, in which the loop is received. These wheels are connected to connecting parts 43 so as to be secured against relative rotation thereto, said connection parts 43 being hingedly connected to the connection arrangement 4p and the second element 2p respectively about axles 74. The first link 9pB capable of compression-force transmission has its end portions hingedly connected to the connection parts 43, and more specifically such that the hinge axles 7p are concentrical to the axes of the diverting members 98, 99.

In other words, the first link 9pB is pivotably about its joints 7p in planes parallel to the joint axles 74 connecting the connection parts 43 and the connection arrangement 4p and the second element 2p respectively. Thus, this means that the links 9pA and 9pB may be described as being connected to the connection arrangement 4p and the second element 2p so as to be pivotable in all directions. In such pivoting about the joint axles 7p, the traction force transmitting elements or links 9pA will, at different places along the periphery of the diverting members 98, 99, exit and enter respectively the peripherical grooves of the diverting members while executing a parallel controlling function between the connection arrangement 4p and the second element 2p.

As far as the link 14p is concerned, it may be established that it forms third four-links systems FS3 with each of the links 9pA and 9pB. Also the link 14p may be carried out with diverting members according to 9pA, 9pB, 7p, 47.

Figures 7, 8:
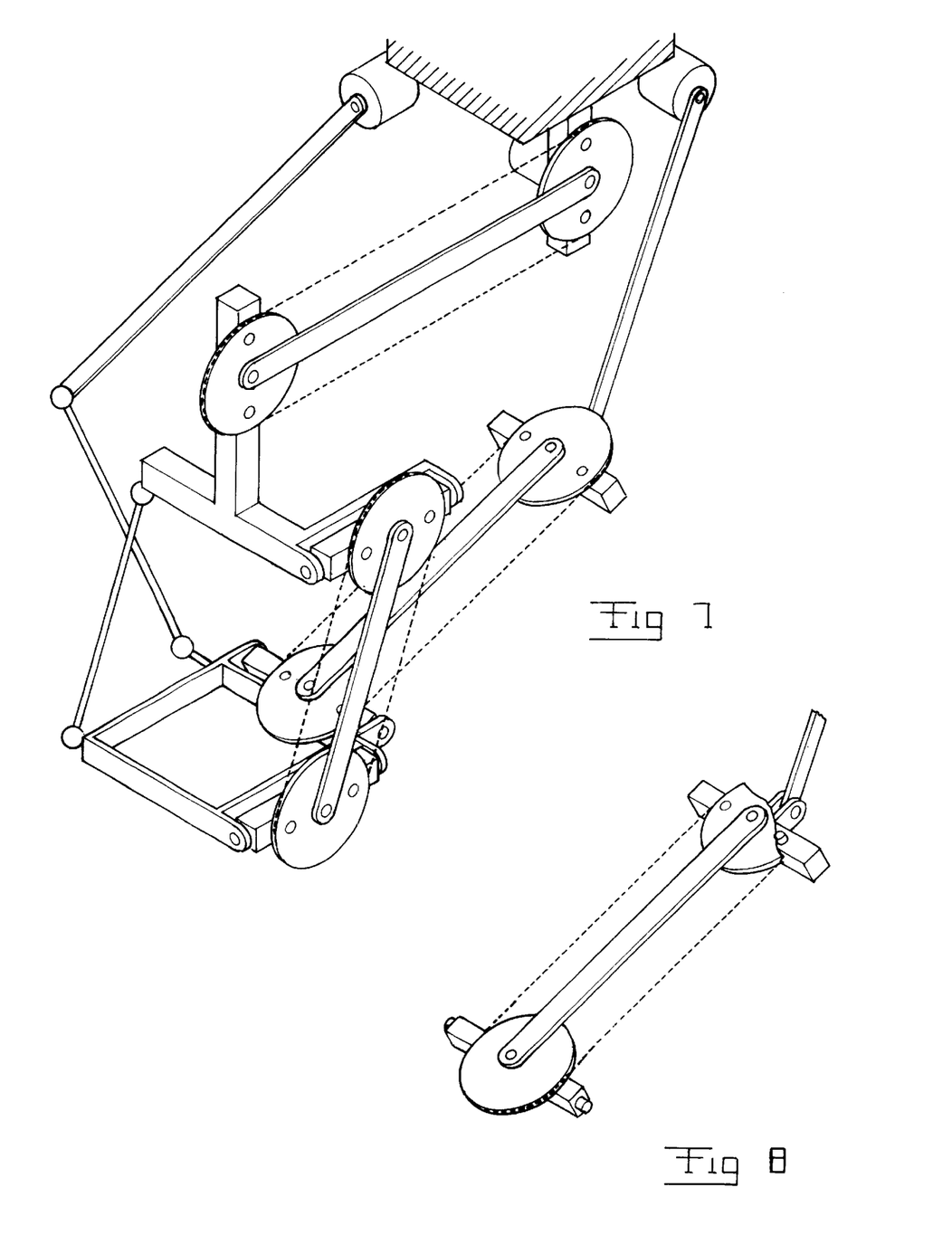
FIG. 7 is a perspective view of a robot, which in its basic features corresponds to the one illustrated in FIGS. 1–4 but having its four-links system formulated in a different manner.
FIG. 8 is a partly cut perspective view of a detail appearing from FIG. 7.

It is illustrated in FIGS. 7 and 8 how a robot similar to the one discussed in FIGS. 1–4 may be achieved by means of parallel controlling link systems of the kind described with assistance of FIG. 6, and more specifically such that these parallel controlling link systems consisting of diverting members, traction force transmitting element loops and central further links form the various four-links systems FS1, FS2 and FS3, the parallel link system 26 in addition being provided with such a parallel controlling link system as described with the assistance of FIG. 6.

Figures 9, 10:
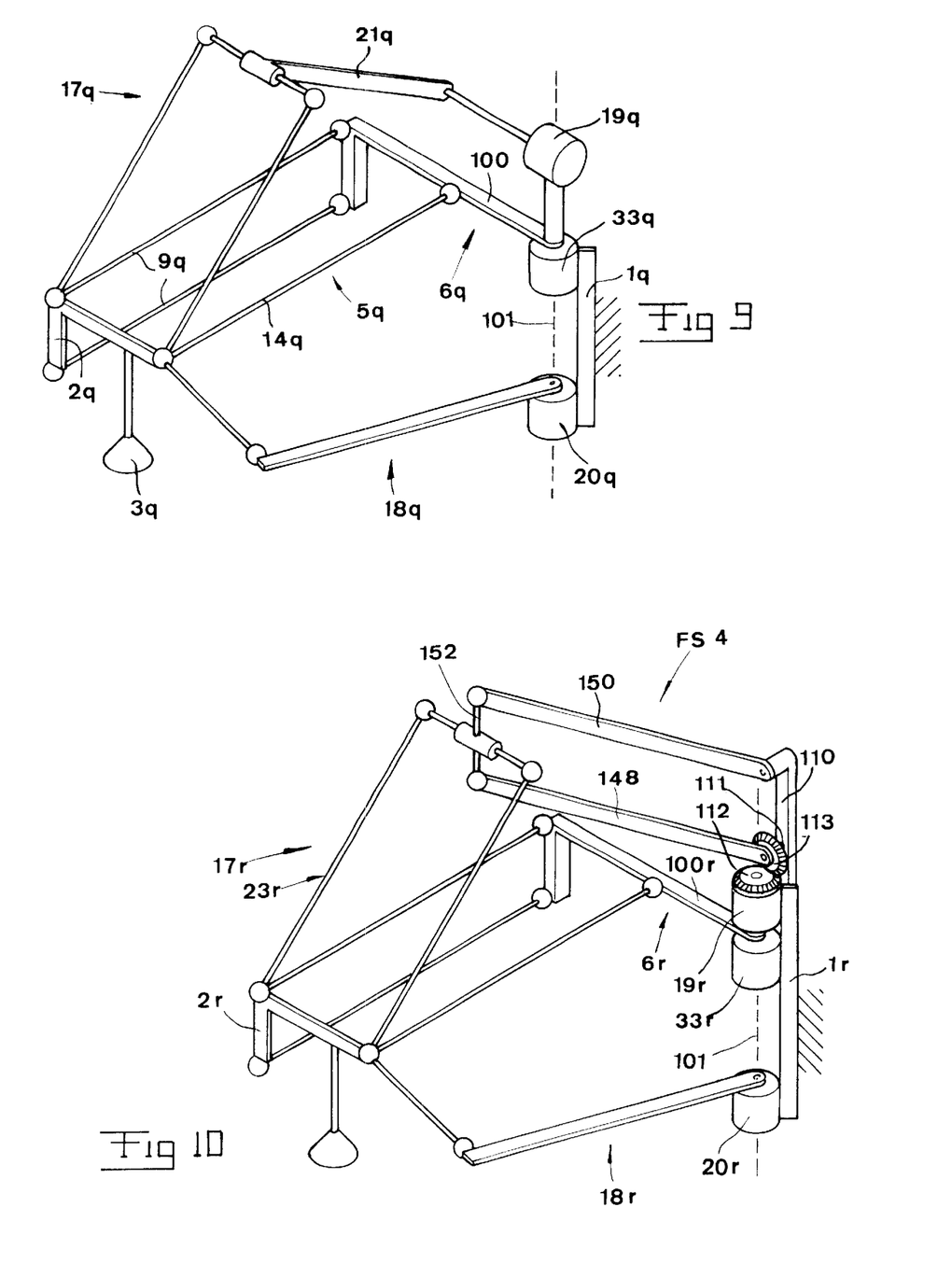
FIG. 9 is a perspective view of an alternative robot design.
FIG. 10 is a perspective view of a further alternative.

Under normal conditions, it is preferable to form the four-links systems FS1, FS2 and FS3 with their links in the manner described with the resistance of FIGS. 1–4 by designs such as those illustrated in FIGS. 6–8 are functionally equivalent and are included within the scope of the invention as far as the actual definitions of the links 9, 14; 10, 11 and the four-links systems formed thereby are concerned. FIG. 9 illustrates a robot variant corresponding to the one described with assistance of FIGS. 1–4 as far as the link arrangement 5q and the force-applying first and second arrangements 17q and 18q are concerned. The difference consists in the movement arrangement 6q here not being designed as four-links system FS2 but instead as a pivot arm 100 pivotably arranged relative to the first element 1q, which is shaped as a base member, about an axis 101. This pivot arm 100 will at the same time fulfil the function of the connection arrangement 4 in the previously described embodiment since the first and third links 9q, 14q are connected to the pivot arm 100 via joints. It is in this connection pointed out that the length of the pivot arm 100 illustrated in FIG. 9 may be adjusted to the desired working area of the robot. The force-exerting arrangement 33q executing pivoting of the pivot arm 100 about the axis 100 comprises a force-exerting member, the stator of which is connected to the first element 1q whereas the rotor thereof is connected to the pivot arm 100. Besides, it is pointed out that the force-exerting member 19q comprised in the force-applying arrangement 17q is also connected to the rotor of the force-exerting member 33q so as to accompany the rotor in its rotation. The force-exerting member 19q has its weight centered relative to the pivot axis 101 so as to minimize inertia occurring on pivoting of the pivot arm 100.

In the example the pivot arm 100 is illustrated as orientated substantially perpendicularly to the pivot axis 101. This is, however, not a necessity.

It is preferable, although not necessary, that the axis of the force-exerting member 20q is co-axial to the axis of the force-exerting member 33q.

It is pointed out that since the movement arrangement, which corresponds to the one denoted 6 in FIGS. 1–4 and which is formed as a pivot arm 100, will carry out a pivoting movement about the axis 101 and the working member 3q as a consequence thereof will be pivoted depending upon the pivoting movement, compensating turning of the working member 3q is, depending on the circumstances, necessary to avoid the pivoting movement of the pivot arm 100 to locate the working member 3q in orientations (rotational positions) which are not desired. Thus, a pivot arm embodiment of the movement arrangement 6 according to FIGS. 1–4 is normally only cost efficient when an operating device for turning the working member 3q relative to the second element 2q is required for other reasons. This disadvantage is in applications compensated by the fact that the pivot arm solution enables the entire robot to be pivoted around in a large angle (up to 360°) and in certain embodiments more than one revolution (even several revolutions), which gives a large working area and a possibility to always resort to the most direct route independently of on which revolution the pivot arm is present.

The variant of the embodiment in FIG. 9 illustrated in FIG. 10 involves differences a.o. as far as the design of the driving arrangement is concerned. As before, the device comprises first and second force-applying arrangements 17r, 18r for causing the second element 2r to move relative to the pivot arm 100r (movement arrangement 6r). The third force-applying arrangement 33r serves for pivoting the pivot arm 100r relative to the first element 1r. These different force-applying arrangements comprise force-exerting members 19r, 20r and 33r respectively consisting of drive means with stators and rotors. The drive means 19r, 20r and 33r have their stators secured relative to the first element 1r, i.e. in the example some kind of base, which in itself may be mobile. The rotors of the rotary means are arranged with their axes of rotation substantially parallel and preferably coinciding, as is indicated in FIG. 10, with the axis 101.

The rotor of the rotary means 19r is adapted to actuate, via an angular rear 112, 113, the second element 2r via the link arm arrangement 17r. A first gear wheel 112 included in the angular gear is secured to the rotor of the rotary means 19r whereas a second gear wheel 113 included in the angular gear is rotatably supported by a carrier 110, which is adapted to be put into a rotational movement on pivoting of the pivot arm 100r by means of the rotary means 33r. In other words, the rotor of the rotary means 33r is connected to the carrier 110 so as to be secured against relative rotation thereto. The axis of rotation of the gear wheel 113 is denoted 111.

A link arm 148 comprised in the link arm arrangement 17r is rigidly connected to the gear wheel 113 to be put in a pivoting motion on rotation of the gear wheel.

The embodiment described according to FIG. 10 has the advantage that the stators of the rotary means do not have to be put in movement when the device is to be moved but it is only the rotors of the rotary means that execute what is required. This gives rise to an embodiment having a minimum of mass inertia. It is pointed out that the carrier 110 and the angular gear 112, 113 may be realised with substantially less mass than the stator of a rotary means. In the embodiment according to FIG. 9, there is the disadvantage that the entire rotary means 19q must be put in rotation by means of the rotary means 33q.

In addition, the variant illustrated in FIG. 10 differs from the embodiment according to FIG. 9 in that a four-links system FS4 designed as a parallelogram is present instead of a link arm 21q (see FIG. 9) connected to the rotor of the rotary means 19q so as to be secured against relative rotation thereto. The rotor of the rotary means 19r is connected to one of the links 148, 150, namely the one denoted 148, in FS4.

The four-links system FS4 is coupled to the link system 23r at its end turned away from the rotary means 19r. The links 148 and 150 are movable relative to the carrier 110 with one degree of freedom, namely pivoting about parallel axes. The carrier 110 may be said to form a link in FS4. The remaining link 152 thereof is connected to one of the links in the link arm arrangement 23r.

Thus, the rotary means 19r is capable of causing the four-links system FS4 to pivot.

It is pointed out that the solution with an axle and an arm 21q according to FIG. 9, i.e. without parallelogram, also may be obtained with a stationary rotor of 19r and an angular gear 112. 113.

Figure 11:
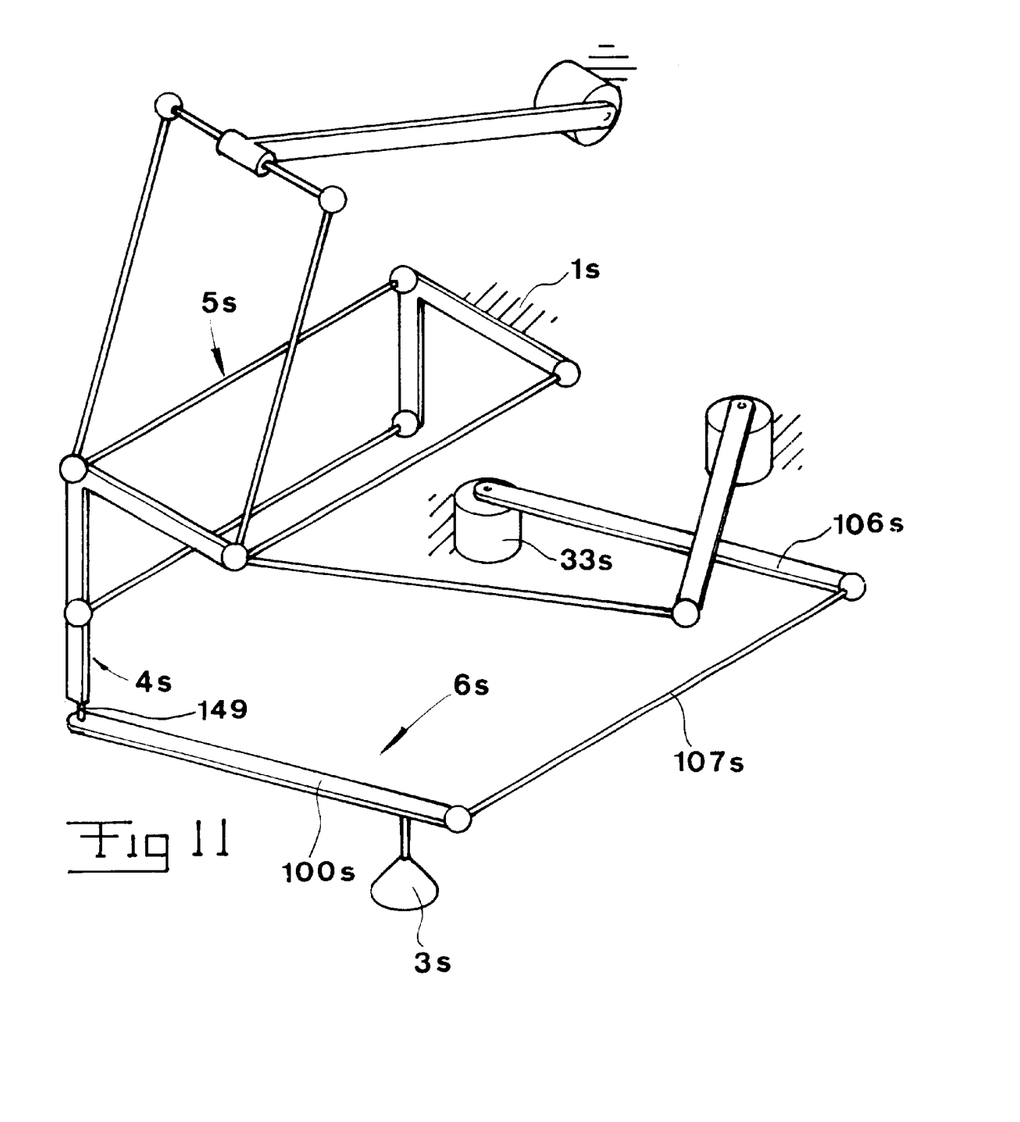
FIG. 11 is a further perspective view of a robot alternative.

FIG. 11 illustrates an embodiment reminding about the one in FIGS. 9 and 10 in the sense that also here the movement arrangement 6s is realised as a pivot arm 100s. The link arrangement 5s has its links hingedly connected with one of the its ends to the base-like first element 1s. The second end of the links in the link arrangement 5s are hingedly connected to a connection arrangement 4s. The links in the link arrangement 5s are pivotable in all directions relative to the first element 1s as well as the connection arrangement 4s. The pivot arm 100s is pivotably connected to the connection arrangement 4s about an axle denoted 149. This axle may have an arbitrary direction relative to the longitudinal extent of the links contained in the link arrangement 5s. As is the case, which will be described later, according to FIGS. 12 and 13, a force-applying arrangement 33s acts upon the pivot arm 100s via a link arm arrangement 106s, 107s of a similar nature as the one in the embodiment according to FIGS. 12 and 13. A working member 3s may be arranged at that end of the pivot arm 100s which is remote form the connection arrangement 4s.

Figure 12:
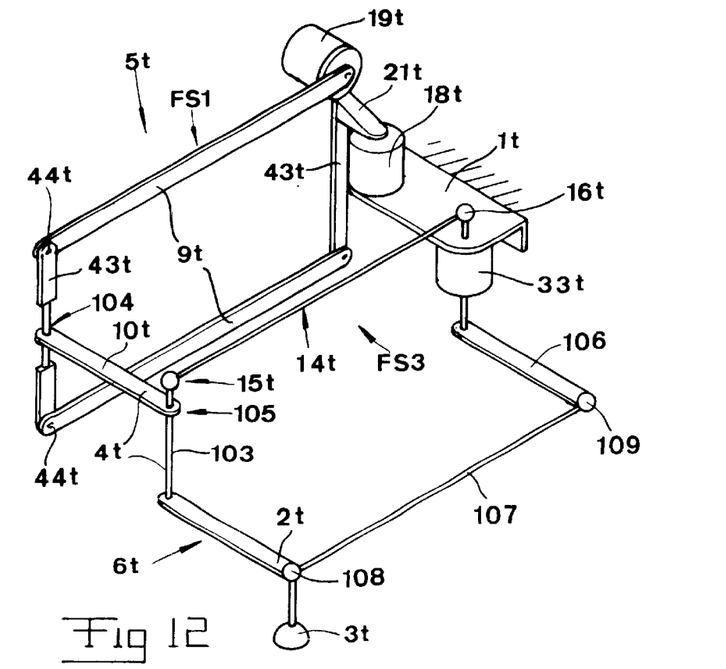
FIG. 12 is a perspective view of a further robot design.

FIG. 12 illustrates an embodiment where the movement arrangement 6t is arranged between the connection arrangement 4t and the second 2t of the elements. The first link arrangement 5t is provided between the connection arrangement 4t and the first 1t of the elements. The second 2t of the elements is formed by or intended to carry a working member 3t. The movement arrangement 6t is formed by an arm pivotable relative to the connection arrangement 4t. The links 9t of the first four-links system FS1 are pivotable in all directions relative to the first element 1t and the connection arrangement 4t for the following reason: A force-applying arrangement 18t has a movable portion connected to the links 9t via the link 43t so that FS1 may be pivoted in the XY-plane. The power-exerting arrangement 19t has a stationary portion rigidly connected to a movable portion 21t of the further force-applying arrangement 18t, which has a stationary portion secured relative to the first element 1t. A link 43t is rigidly connected to the movable portion 21t of the force-applying arrangement 18t and the stationary portion of the force-applying arrangement 19t. The arrangements 18t and 19t are suitably formed by rotary means. The links 9t may now be pivoted in planes parallel to planes in which they reside themselves by means of the arrangement 19t. By means of the arrangement 18t, the links 9t may be rotated about an axis at an angle, suitably a right angle, to the just described pivot axis. Thus, the links 9t may be operated about two axes directed at an angle to each other. It is pointed out that the links 9t have only one degree of freedom, i.e. pure pivoting, relative to the link 43t, which together with the rotary means 19t interconnects the links 9t in the area of the pivot axis. Thus, the arrangement 19t causing pivoting of the links 9t will be moved along by the arrangement 18t on rotation thereof. The ends of the links 9t turned away from the arrangements 18t and 19t are hingedly connected to a connection part 43t via hinges 44t having only one degree of freedom, i.e. pivoting about a single axis. The connection arrangement 4t comprises a first element 10t, which is pivoted relative to the connection part 43t with one degree of freedom, i.e. pure pivoting about the longitudinal direction of the connection part 43t, while forming a joint 104. The connection element 10t is pivoted about a further connection element 103 included in the connection arrangement 4t with one degree of freedom, i.e. a pure pivoting movement about an axis parallel to the pivoting of the connection element 10t about the connection part 43t while forming a joint 105. The connection element 103 is connected to the first element 1t via a link arm arrangement 14t. This link arm arrangement 14t comprises a link arm which is connected to the connection element 103 and the first element 1t respectively via joints 15t and 16t respectively with at least two degrees of freedom concerning pivotability. Thus, these joints 15t, 16t should allow pivoting about two axes placed at an angle to each other. A further degree of freedom in the form of rotation could also be allowed, in which case ball joints could be used for the joints 15t, 16t in addition to cardan joints etc. It is suitable, although not necessary, that the link arm 14t forms a four-links system FS3 with each of the links 9t. It is preferred that the four-links system FS1 and FS3 are given the form of parallelograms so that the orientation of the connection element 10t always is maintained on pivoting of the links 9t and 14t.

The joints 44t and 104 provide the links 9t with pivotability in all directions relative to the connection arrangement 4t (its part 10t).

In order to pivot the pivot arm 6t relative to the connection element 103 included in the connection arrangement 4t, there is provided a force-applying arrangement generally denoted 33t. This comprises a force-exerting member having a portion stationary relative to the first element 1t and a movable portion having one degree of freedom relative to the stationary portion. In the example an arm 106 is connected to the movable portion of the force-exerting member, said arm 106 being connected to the pivot arm 6t via a link arm 107. The joints 108 and 109 respectively of the link arm 107 relative to the arm 106 and the pivot arm 6t comprise at least two degrees of freedom, namely pivotability about non-parallel axes, but may also be designed to allow rotation, i.e. have the character of ball joints.

Figure 13:
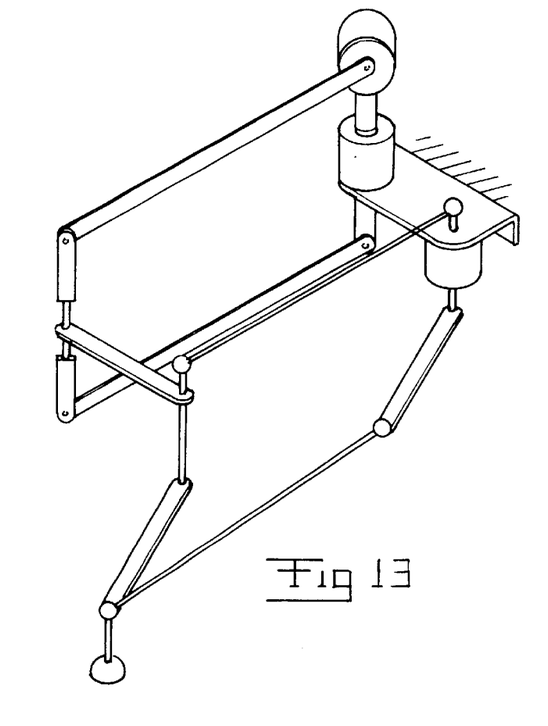
FIG. 13 is a view similar to FIG. 12 but illustrating the robot in a different position.

The embodiment according to FIGS. 12 and 13 may be used so that the four-links systems FS1 and FS3 may be pivoted in all directions relative to the first element 1t in order to vary the position of the connection arrangement 4t by operating the force-exerting arrangements 18t and 18t. The pivot arm 6t may be caused to pivot relative to the connection arrangement 4t so that the working member 3t can be operated in space by operating the force-exerting arrangement 33t.

As appears from FIG. 12, the second element 2t can be said to form the extreme end of the pivot arm 6t in this example. It would also be possible to express oneself such that the second element 2t is formed by the working member 3t itself.

It is pointed out that in a variant, not illustrated, of the embodiment according to FIGS. 12 and 13, the angular gear solution shown in FIG. 10 could be used in order to reduce means inertia.

Figure 14:
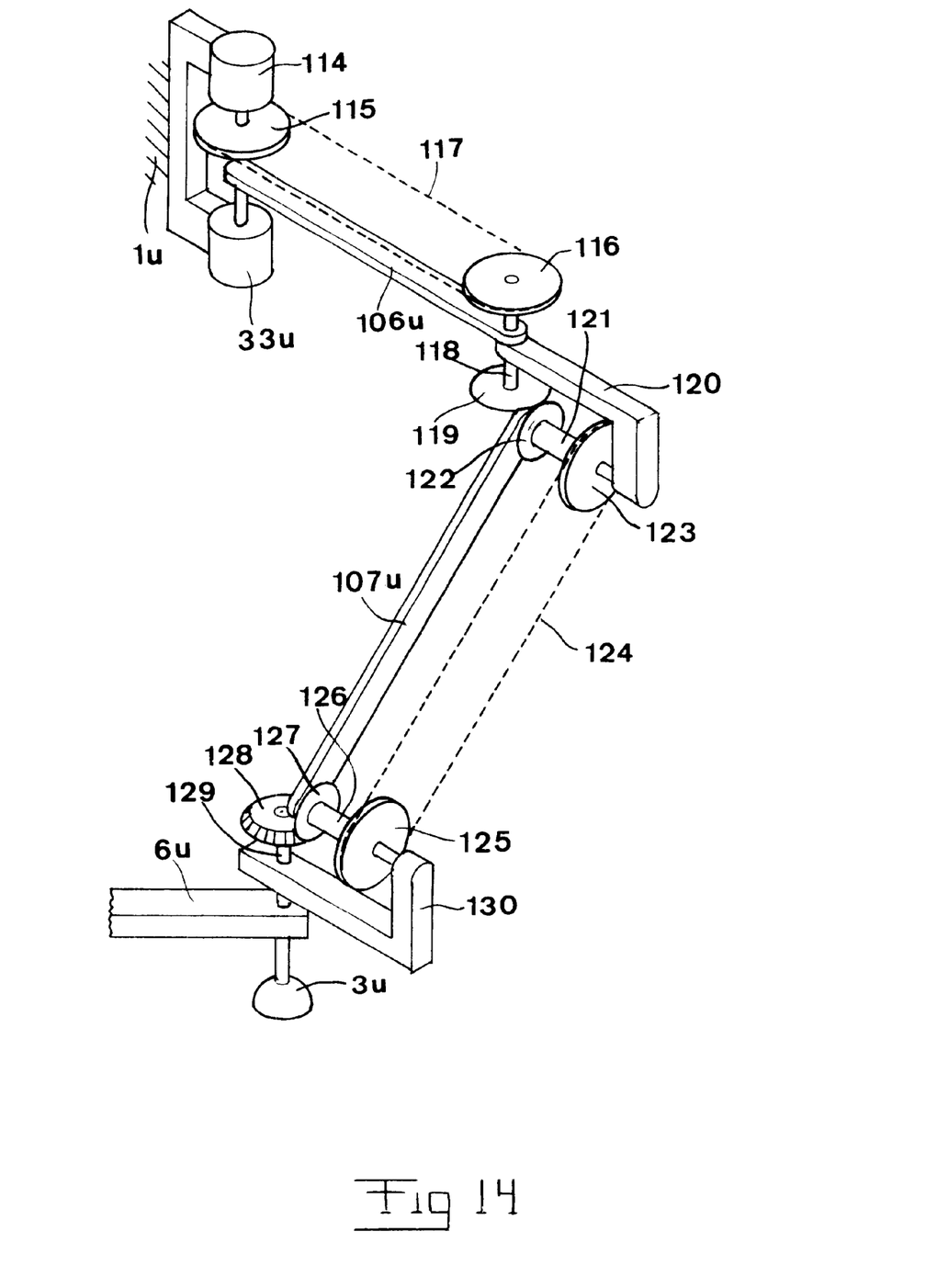
FIG. 14 is a perspective view illustrating a driving device intended for use in a robot of the basic type according to e.g.

FIG. 14 illustrates an embodiment suitable for achieving turning of the working member 3u starting from the first element 1u so that an adequate turning position of the working member may be adjusted. Such an adjustment of turning position may be caused by various manipulative tasks to be carried out by the working member but is as a rule also desirable in that the pivoting embodiment of the robot means that the working member 3u on such pivoting will change its turning position in space. It is illustrated in FIG. 14 that a power-exerting member 33u has a stationary portion secured to the first element 1u and a movable portion connection to an arm 106u. The pivot arm is denoted 6u and the link arm 107u analogous to the previously described link arm having the same numbering interconnects between the arm 106u and the pivot arm 6u. By suitable driving of the force-exerting member 33u the pivot arm 6u may be pivoted relative to the connection arrangement 4u (not illustrated in FIG. 14) by intermediary of the arm 106u and the link arm 107u.

On the first element 1u there is a driving motor 114 for exerting energy for turning the working member 3u. The drive motor 114 has a stationary portion connection to the element 1u and movable portion, here in the form of a drive axle, adapted to put a drive wheel 115 in rotation. On the extreme end of the arm 106u, a further wheel 116 is rotatably journalled and about these two wheels 115, 116 there is laid a traction force transmitting element 117 formed as a loop. The wheel 116 is connected to an axle 118, on which a bevel gear wheel 119 is secured. The axle 118 is rotatable relative to the extreme end of the arm 106u. About the axle 118 there is also journalled a support element 120, which may be moved about the axle 118 with one degree of freedom, i.e. pure pivoting. This support member 120 is pivotably connected to an axle 121 with one degree of freedom, said axle 121 also being rotatable relative to the link arm 107u. A bevel gear wheel 122 and a wheel 123 are connected to the axle 121 so as to be secured against rotation relative thereto, a traction force transmitting element 124 formed as a loop being laid about the wheel 123, said element 124 also being laid about a further wheel 125, which is rigidly connected to an axle 126 so as to be secured against relative rotation thereto, said axle 126 being journalled in the link arm 107u at the extreme end thereof.

The gear wheels 119 and 122 form in unison an angular gear in that the axles 118 and 121 extend substantially perpendicularly to each other. The axle 126 is rigidly connected to a bevel gear wheel 127, which is in engagement, while forming a further angular gear, with a bevel gear wheel 128 rigidly connected to the working member 3u. The gear wheel 128 is rigidly secured to an axle 129. This axle extends perpendicularly to the axle 126. A further support element 130 is journalled relative to the two axles 126 and 129 with one single degree of freedom, i.e. pure pivoting.

The embodiment according to FIG. 14 operates in the following manner: On actuation of the force-exerting member 33u, the arm 106u may be pivoted and the pivot arm 6u be put in pivoting with intermediary of the link arm 170u. The connections/force transmissions via the angular gears and the support elements 120 and 130 pivotably connected to the gear wheel axles means that there will occur possibility for movement in two degrees of freedom, namely pivoting about two axes perpendicular to each other, in the transition between on one hand the arm 106u and the link arm 107u and on the other hand between the link arm 107u and the pivot arm 6u. This means that the arm 106u pivotable in one plane is capable of operating the pivot arm 6u also when the latter is displaced away from the pivoting plane of the arm 106u as also is indicated in FIG. 14. On driving of the drive motor 114, the drive wheel 115 will be put into rotation. This drive wheel drives the traction force transmitting element 117 in the form of a belt, line, wire or chain so that also the wheel 116 is put into rotation. The axle 121 is put in rotation via the angular gear 119/122 and this also causes rotation of the wheel 123, which will drive the wheel 125 via the element 124 such that the axle 126 is put into rotation. This will cause turning of the working member 3u via the angular gear 127/128.

Figure 15:
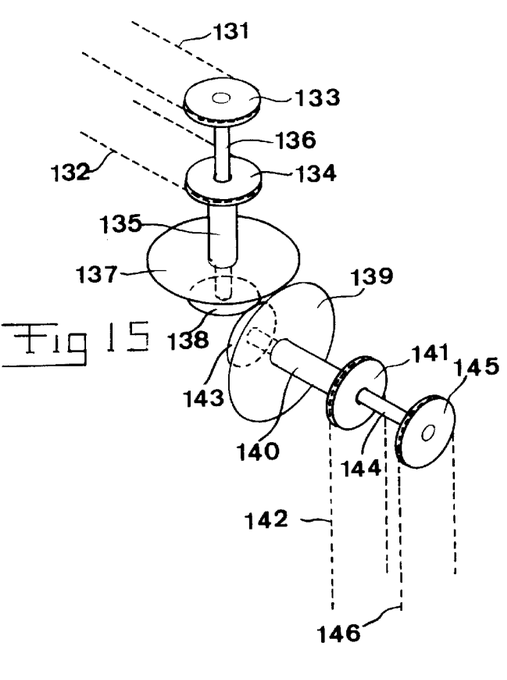
FIG. 15 is a diagrammatical and perspective view illustrating how the double power transmission may be realised in a joint having two degrees of freedom, more specifically freedom to pivot about two axes extending at an angle relative to each other.

FIG. 15 illustrates in principle a solution for achieving double force transmission between two parts of the device, said parts being pivotable relative to each other about double non-parallel axes. Compared to the force transmission between the arm 106u and the link arm 107u illustrated in FIG. 14, force transmission would be possible in double regard with assistance of the embodiment according to FIG. 15. The explanation thereto is that double sets of traction force transmitting elements 131, 132 are arranged in FIG. 15, said sets of elements being driven by separate drive motors and laid over a respective driven wheel 133, 134. The axle 135 of the wheel 134 is designed as a tubular axle whereas the axle 136 of the second wheel 133 protrudes through the tubular axle 135. The tube axle 135 is provided with a first bevel gear wheel 137 whereas the axle 136 is provided with a second bevel gear wheel 138 on its end having projected through the tube axle 135. The gear wheel 137 connected to the tube axle 135 is in engagement with a bevel gear wheel 139 arranged on a tube axle 140 while forming an angular gear. A wheel 141 is rigidly connected to the tube axle 140, the traction force transmitting element 142 driven by the wheel 141 being laid over the same.

A further bevel gear wheel 143 engages with the gear wheel 138 and is secured to an axle 144, which projects through the tube axle 140 and is connected to a wheel 145 driving a traction force transmitting element 146, which runs further to a wheel (not illustrated) driven thereby, a fact which also is valid for the element 142.

The transmission described in FIG. 15 allows, accordingly, a double force transmission and at the same time a joint having two degrees of freedom, i.e. a joint allowing pivoting about two axes placed at an angle to each other. The transmission may be used in order to provide the associated robot structure with two degrees of freedom. For instance, the components 131, 133, 136, 138, 143, 144, 145 and 146 may be used for turning the working member 3 whereas the other components are used for a different degree of freedom of the robot, e.g. movement of a part which in turns carries the working member.

Figure 16:
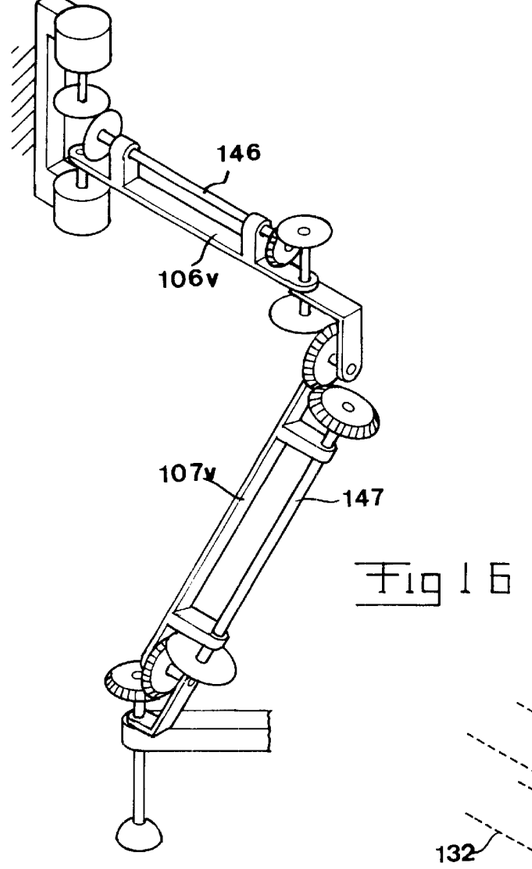
FIG. 16 is a perspective view similar to the one in FIG. 14 but illustrating a somewhat modified embodiment.

FIG. 16 illustrates an alternative to the embodiment discussed with assistance of FIG. 14. Instead of force transmission by means of a traction force transmitting elements and wheels driving these elements and being driven thereby respectively, axle transmissions 146, 147 arranged along the arm 106v and the link arm 107v are used herein. This means that in the joint transitions further angular gear functions must be introduced as is immediately visible in the figure.

Common to all described embodiments is that a suitable control unit, particularly in the form of a computer, is arranged to control the force-exerting members of the various robot embodiments for the purpose of causing the second element 2 or members coupled directly or indirectly thereto to move in intended paths.

It is pointed out that the expressions "force-exerting members" and "drive means" respectively should be interpreted in an extremely extensive sense, unless otherwise is expressly stated. When these members and means respectively are stated to comprise stators and rotors, this includes that between said stators and rotors are coupled suitable gears for the purpose of achieving a desired gear ratio.

POSSIBLE MODIFICATIONS

It is evident that the invention is not only limited to the embodiments discussed above. Thus, detailed adaptations of the embodiments may be carried out depending upon the circumstances without leaving the scope of the invention appearing from claim 1.

What is claimed is:

1. A device for relative movement of two elements, comprising:
   a link arrangement;
   a movement arrangement coupled between the link arrangement and a first element,
   wherein the link arrangement is coupled between the movement arrangement and a second element,
   said second element being adapted and arranged to carry a working member,
   the link arrangement having links pivotably connected via joints relative to the movement arrangement and the second element,
   the movement arrangement being adapted to move relative to the first element, wherein the movement arrangement is shaped as a pivot arm;
   first and second force-applying arrangements arranged to cooperatively move the second element relative to the pivot arm; and
   a third force-applying arrangement which pivots the pivot arm relative to the first element,
   wherein the first, second, and third force-applying arrangements each comprise a respective first, second, and third force-applying member which includes an associated rotating motor,
   wherein the associated rotating motor for each of the second and third force-applying members has a respective stator secured relative to the first element and aligned so that associated axes of rotation are aligned substantially parallel with each other.

2. A device according to claim 1, wherein a first set of links in the link arrangement, in conjunction with the pivot arm and the second element, form at least one first four-links system.

3. A device according to claim 2, wherein at least two of the first set of links comprise two traction force transmitting elements arranged to maintain an orientation in space of the second element upon a movement of the link arrangement.

4. A device according to claim 3, wherein the two traction force transmitting elements are part of a loop laid about diverting members connected to the connection arrangement and to the second element belonging to the link arrangement respectively, the loop being fixed against displacement relative to the diverting members.

5. A device according to claim 4, wherein the diverting members include substantially arc-shaped diverting paths.

6. A device according to claim 5, wherein a compression force transmitting first link has opposite ends thereof located substantially centrally relative to the diverting paths.

7. A device according to claim 1, wherein the first force-applying member is adapted and arranged to pivot with the pivot arm when the third force-applying member pivots the pivot arm.

8. A device according to claim 1, wherein the first force-applying member has an associated stator secured to the first element and an associated rotor adapted and arranged to actuate the second element via an angular gear.

9. A device according to claim 8, wherein a first gear of the angular gear is secured to the rotor of the first force-applying member, whereas a second gear of the angular gear is rotatably by a carrier adapted to be placed in rotation while the pivot arm is pivoting in response to the third force-applying member.

10. A device according to claim 1, wherein a transmission, driven by a drive motor on the first element which turns a working member on the second element, comprises force transmitting members extending along the link arrangement, the connection arrangement, the movement arrangement and at least one other link arm arrangement of the device,
   said force transmitting members comprising axles and traction force transmitting elements laid around diverting wheels and angular gear members arranged between said axles and said diverting wheels for force transmission without interfering with a mobility of the device.

11. A device according to claim 1, wherein double sets of traction force transmitting elements are laid about diverting wheels which are rotatable about axles, said double sets of traction force transmitting elements being driven by separate drive motors, wherein an axle of one of the diverting wheels is a tubular axle, and an axle of a second diverting wheel projects through the tubular axle, wherein the axle of the one of the diverting wheels and the tubular axle respectively are connected to respective angular gear wheels which, together with corresponding gear wheels of a further set of axles supporting rotatable diverting wheels for traction force transmitting elements, form a joint pivotable about double non-parallel axles, the angular gear wheels engaging with each other and transmitting a force through an intermediate angular gear by said gear wheels.

12. A device according to claim 1, wherein said device includes an industrial robot, wherein the second element carries at least one working member.

13. A device according to claim 1, wherein the second and third force-applying members have respective rotors arranged with respective axes of rotation.

* * * * *